United States Patent
Harding

[11] Patent Number: 6,049,088
[45] Date of Patent: Apr. 11, 2000

[54] FLUID OVERFILL PROBE WITH ANTI-REFLECTIVE GUARD

[75] Inventor: Michael J. Harding, Methuen, Mass.

[73] Assignee: Scully Signal Company, Wilmington, Mass.

[21] Appl. No.: 09/005,099

[22] Filed: Jan. 9, 1998

[51] Int. Cl.[7] .................................................. G01N 15/06
[52] U.S. Cl. ........................... 250/577; 340/619; 73/293
[58] Field of Search .................................... 250/577, 573, 250/903; 340/619, 620; 356/136; 73/293

[56] References Cited

U.S. PATENT DOCUMENTS

| | | | |
|---|---|---|---|
| 4,246,489 | 1/1981 | Yoshida et al. | 250/577 |
| 4,961,069 | 10/1990 | Tsaprazis . | |
| 5,198,681 | 3/1993 | Pontefract . | |
| 5,279,157 | 1/1994 | Mattis et al. | 250/577 |

FOREIGN PATENT DOCUMENTS

| | | |
|---|---|---|
| 0430111 A2 | 6/1991 | European Pat. Off. . |
| 580802 | 10/1976 | Switzerland . |
| 582351 | 11/1976 | Switzerland . |

*Primary Examiner*—Que T. Le
*Assistant Examiner*—Kevin Pyo
*Attorney, Agent, or Firm*—Kudirka & Jobse, LLP

[57] ABSTRACT

A optically-based fluid overfill prevention probe has an anti-reflective guard which prevents light external to a prism of the probe from reaching a photodetector of the probe. The probe has a light source which couples light into a prism that is detected by a photodetector when it is internally reflected within the prism. When the prism is contacted by fluid in a container being monitored, the light from the light source exits the prism, and is no longer detected by the photodetector. To avoid the light exiting the prism from being accidentally reflected back into the prism in a direction which would allow it to be detected by the photodetector, the anti-reflective guard is located within a viewing radius of the photodetector, and blocks light external to the prism which might otherwise be detected by the photodetector. The guard is also located within an optimal reflection distance from the prism, so as to prevent the reflection of light exiting the probe back to the photodetector by a reflective surface located between the guard and the prism. The guard preferably includes a wicking portion proximate to the prism that wicks moisture away from a prism surface. The wicking portion is preferably an edge formed by two surfaces having an acute angle relative to each other.

36 Claims, 5 Drawing Sheets

FLUID OVERFILL PROBE WITH ANTI-REFLECTIVE GUARD

BACKGROUND OF THE INVENTION

1. Field of the Invention

This invention relates to fluid transfer control apparatus and, more particularly, to the use of optically-based overfill probes for detecting when fluid being transferred into a container has reached a predetermined level.

2. Description of the Related Art

In the art of fluid transfer control, particularly as it applies to the petroleum industry, one of the more common control devices is an overfill probe for monitoring the loading of fluid into a container, such as a petroleum tanker compartment. An output signal from such a probe indicates when the fluid has reached the predetermined level, and may be used as an indicator by a fluid transfer controller for discontinuing fluid flow into the container. In this way, overfilling of the container, which is particularly hazardous when dealing with flammable liquids such as gasoline, can be avoided.

One type of overfill probe which is particularly common in the petrochemical industry makes use of an optical signal which is coupled into a medium having a relatively high index of refraction, such as a glass or non-opaque plastic. This medium is specially-shaped and commonly referred to as a "prism." The prism is shaped to cause internal reflection of the optical signal when surrounded by air. The shape of the prism and the direction at which the optical signal is coupled into the prism are such that the reflection of the optical signal within the prism redirects the signal toward a photodetector. This photodetector generates an output signal which indicates that the optical signal is being detected.

Figure 1:
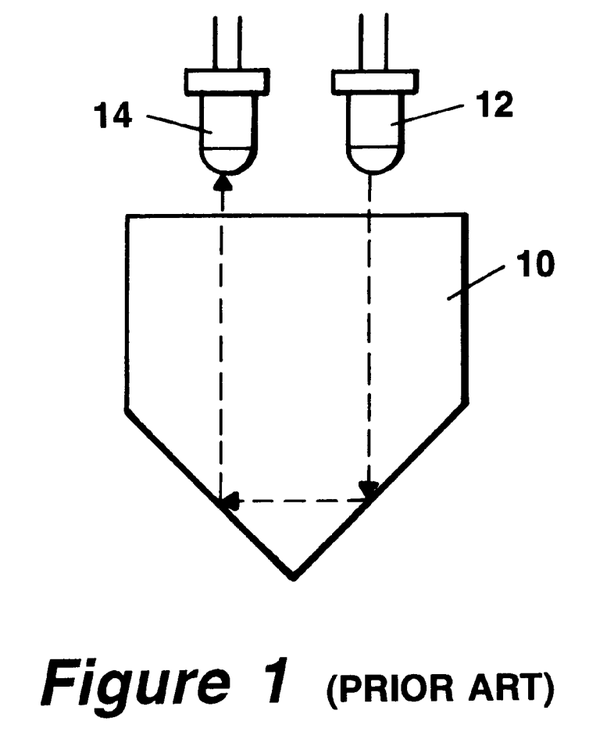
FIG. 1 cross-sectional schematic view of a prism, a light source and a photodetector of a prior art overfill probe.

A schematic illustration of this prior art probe design is shown in FIG. 1. In the plane of the optical signal path, the prism 10 has an angled cross section which allows for two internal reflections between a light source 12 and photodetector 14. When the prism 10 is surrounded by air, the optical signal (indicated by the broken line arrow in FIG. 1) is reflected at two interfaces between the prism material and the surrounding air, and redirected toward photodetector 14. The photodetector 14 generates an electrical output signal which indicates that the optical signal is being detected. This output signal is referred to as a "permit" signal, since it indicates that the fluid level permits further loading of the container.

As shown in FIG. 1, this particular prior art prism 10 uses a forty-five degree incidence angle (relative to normal) for each of the reflections of the optical signal within the prism 10. Light source 12 and photodetector 14 are oriented in the same direction along the same surface of the prism 10. When in use, the prism is part of a probe which is located within a fluid container, usually near the top of the container. When the fluid in the container rises high enough to contact a prism surface at a location where the optical signal is incident, the forty-five degree angle is no longer sufficient to provide internal reflection of the optical signal at that interface. This is because the prism/air interface becomes a prism/fluid interface, and the fluid has an index of refraction much closer to that of the prism material than does air. According to Snell's law of refraction, (well-known in the art of optical design) the forty-five degree angle of incidence of the optical signal then results in the transmission of the optical signal through the interface due to the similarity of the relative indices of refraction. As a result, the signal is no longer detected by photodetector 14, and the corresponding change in the photodetector output signal is used to discontinue loading of the container.

One of the problems encountered with optically-based fluid overfill probes is the possibility of light exiting the prism and being reflected back into the prism from an outside reflective surface. As mentioned above, the prism/fluid interface allows transmission of light from within the prism out into the fluid. The possibility exists that a reflective surface within the fluid container could be oriented in such a way as to reflect light exiting the prism back toward the prism itself. If a sufficiently strong optical signal was reflected back at a particular angle, the reflected light could re-enter the prism and overcome the detection threshold of the photodetector, thereby resulting in the output of the probe indicating that the fluid level in the container was below the overfill level, when actually the fluid was in contact with the probe prism. While this condition may not be commonplace, it can be particularly hazardous if, for example, a pump which is loading petroleum into the container uses the signal from the probe as an indication of when to discontinue loading. The "false permit" signal could thereby cause a dangerous overflow of flammable liquid.

Another problem lies in the possible buildup of liquid on the surface of the prism. Condensation, in particular, can result when the probe is in a particularly cold location, such as a container on a tanker truck operated in a particularly cold climate. Water vapor, or other liquid vapor, can condense out on the surface of the prism, and cause leakage of the optical signal through the surface of the prism, despite the fact that the prism is not in contact with fluid in the container. If the leakage is significant enough, the amount of light detected by the photodector can drop below the overfill detection threshold and, if the photodector is connected to an automatic shutoff circuit, result in premature termination of a filling operation.

SUMMARY OF THE INVENTION

In accordance with the present invention, an optically-based overfill probe has a light source and a photodetector. The light from the light source is coupled into a prism having a first refractive index. While the prism is surrounded by a medium with a relatively low index of refraction, such as air or fluid vapors, the light within the prism undergoes internal reflection within the prism. A photodetector is oriented such that it detects the internally reflected light, and outputs a signal indicative thereof.

The probe is positioned within a fluid container, preferably at a position within the container that corresponds to a maximum fluid level. As the container is filled, the fluid level rises until it reaches the prism of the probe. The fluid has a relatively high index of refraction and, when it comes in contact with the surfaces of the prism at which light is internally reflected, it changes the refractive qualities of the interface encountered by the light. The light is no longer internally reflected within the prism, and exits the prism through the prism/fluid interface. As a result, the internally reflected signal is no longer detected by the photodetector, the output of which changes accordingly.

The probe of the present invention has an anti-reflective guard that blocks light from entering a prism of the probe in a direction that would result in its reaching the photodetector. In particular, the guard is positioned relative to the prism so as to prevent the reflection of light exiting the prism back toward the prism in a direction which allows the light to reach the photodetector. The position of the guard is also such that any reflective material that might be located between the prism and the guard is too close to the prism to reflect light from the light source in a direction that would result in its being incident on the photodetector.

The guard is attached to a housing of the probe such that it partially encompasses the prism of the probe. The guard has a minimum thickness which is sufficient to block light from a range of directions which substantially includes all directions along which light would eventually be incident on the photodetector. The guard is preferably somewhat V-shaped, and partially encircles the prism. The guard preferably has a light-blocking portion that is supported by two extending portions, each having a pin extending from an opposite end thereof. The pins preferably reside within a slot in the housing that helps prevent the guard from being pulled away from the housing. In addition, the pins may be secured within a potting material (such as that typically used to create a fluid-tight seal between the prism and internal components in conventional optical probes) or some other material having similar anchoring qualities. The guard itself may be any of a number of materials, but is preferably a plastic with a light-absorbing finish.

In a preferred embodiment, the guard has an inner surface with an edge that faces the prism. The edge is positioned close enough to a bottommost portion of the prism that a moisture droplet forming on the bottommost portion of the prism contacts the edge well before a full drop is formed. Thus, the guard tends to wick the moisture downward away from the prism. The edge is composed of adjacent surfaces that meet at the edge, and have a relative angular relationship. Preferably, the angle between the surfaces is less than ninety degrees. The edge is also preferably close enough to the prism that a drop of moisture on the prism can not expand laterally into a path of the optical signal originating within the prism without first contacting the edge. The guard may also have a somewhat spherical portion along its underside, that helps control the direction of moisture that drips from the guard.

DETAILED DESCRIPTION OF A PREFERRED EMBODIMENT

Figure 2:
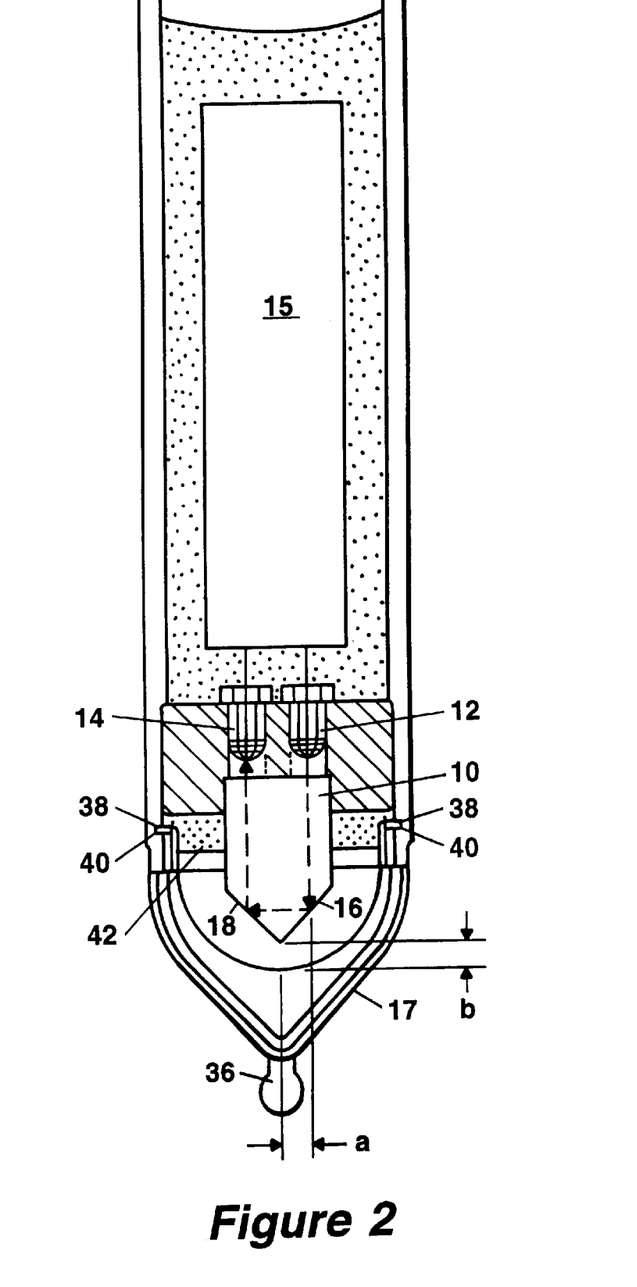
FIG. 2 is a cross-sectional view of an overfill probe according to the present invention.

Depicted cross-sectionally in FIG. 2 is a fluid overfill probe according to the present invention which prevents against the accidental reflection of light outside of the prism back to a photodetector of the probe. The prism 10 is positioned within the probe, with its lower surfaces 16, 18 exposed to allow contact with an external gas or fluid. In discussing the cross section of FIG. 2, surfaces 16 and 18 are referred to as two separate surfaces. However, it will be understood by those skilled in the art that "surfaces" 16 and 18 may actually be one conical surface. The lower portion of the probe may also be some shape other than conical, such as pyramidal. However, important to this embodiment of the invention is that the cross sectional shape of this prism portion is angled at 90°, as shown in FIG. 2.

Positioned adjacent to prism 10 are light-emitting diode (LED) 12 and photodetector 14. The LED and photodector are oriented parallel with each other, and perpendicular to a top surface of the prism 10. Both LED 12 and photodetector 14 also have electrical connections to circuit board 15, which contains circuitry that develops a signal for LED 12, and that receives an output signal from photodetector 14. In this orientation, an optical signal from LED 12 is coupled into the prism and, when the probe is not contacted by fluid, is reflected internally off surfaces 16, 18, and directed toward photodetector 14. The optical signal from LED 12 is detected by photodetector 14, which converts the detected optical signal to the electrical output signal received by the circuitry on circuit board 15. The detection of this signal is indicative of fluid in a container within which the probe is located being below a level necessary to contact regions of surfaces 16, 18 of the prism 10 at which light from LED is incident. However, when fluid in the container rises to contact these regions, the light escapes from the prism into the fluid. In this state, the optical signal from LED 12 is no longer detected by the photodetector 14, and the corresponding electrical output signal to circuit board 15 is no longer generated.

Rigidly secured to the probe is prism guard 17. The guard 17 is a somewhat V-shaped component which partially encircles the lower portion of prism 10. Guard 17 is located relative to prism 10 to block light external to the prism from reaching photodetector 14, and particularly to block the external reflection of light originating from LED 12 back to photodetector 14. Guard 17 accomplishes these functions by being positioned in the optical field of photodetector 14 at a particular distance from the prism 10. How the location of guard 17 relates to its ability to prevent errant light from being detected by photodetector 14 is better understood with reference to FIG. 3.

Figure 3:
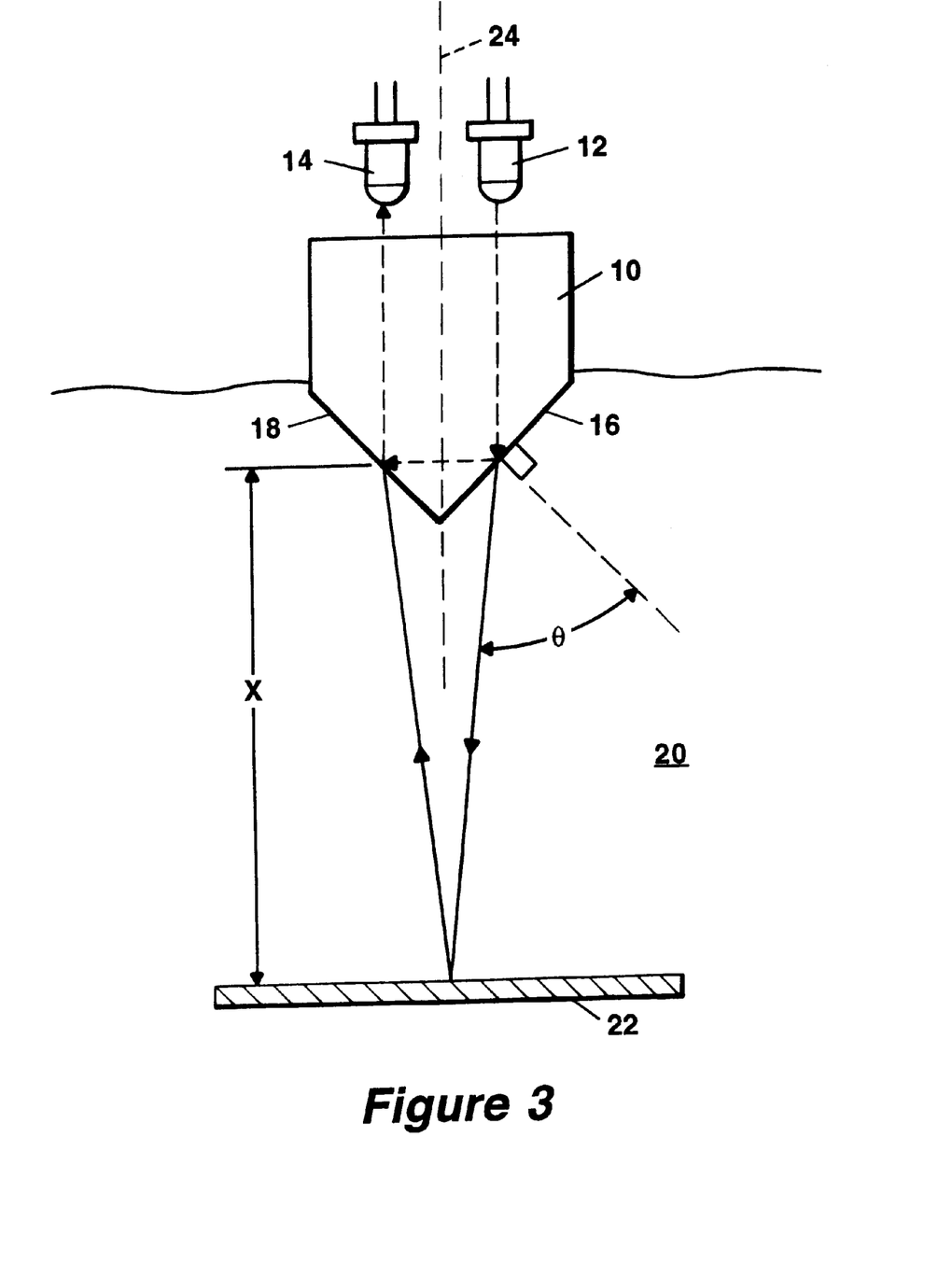
FIG. 3 is a schematic view showing the detection characteristics of a typical optical overfill probe

FIG. 3 is a schematic cross-sectional view of prism 10, LED 12 and photodetector 14. The arrangement of components as shown in FIG. 3 is typical of many existing overfill probes. Surface 16 is angled at 45° relative to the direction faced by the LED 12 and, similarly, surface 18 is angled at 45° relative to the direction faced by photodetector 14. When the prism 10 is surrounded by air, or some other material having a relatively low index of refraction, light coupled into the prism is internally reflected off of surface 16 toward surface 18, and again internally reflected off of surface 18 toward the photodetector, which generates an output indicative of the detection of the internally reflected light. This path of internal reflections is depicted in FIG. 3 by dotted line arrows within the prism.

Since the probe is used in a fluid container, the fact that the prism surface is surrounded by air (i.e. is "dry") is indicative of the fluid level in the container being below a maximum fill level. Thus, when the output signal generated by the photodetector 14 indicates that the internally-reflected LED light is being detected, the container can be further loaded without overfilling. However, when fluid 20 in the container rises to the level that it contacts the surfaces 16, 18 of the prism (in the regions where light from the LED 12 is incident), the higher index of refraction of the fluid 20 results in an interface which no longer reflects light from the LED 12. As a result, light from the LED exits the prism into the fluid 20.

During normal operation, the transmission of the light from LED 12 into the fluid causes the amount of light detected by the photodetector to fall well below a predetermined threshold. The resulting change in the photodetector output signal is thus indicative of the fluid level in the container reaching the surfaces 16, 18 of the prism, and may be used to discontinue loading of the container. However, under certain unusual circumstances, light from the LED 12 may exit the probe, but be subject to a reflection external to the prism which directs it back toward the prism. If the magnitude and angle of the external reflection are sufficient, the LED light can be coupled back into the prism and, if enough of it is directed at the photodetector, can overcome the detection threshold of the photodetector. If the discontinuation of loading of the container is dependent upon the output signal of the photodetector, this can result in a "false permit" signal. That is, the output signal indicates that fluid has not reached the probe prism when, in fact, it has. This, in turn, may result in the container being filled beyond its maximum fill level. Such a condition can be particularly dangerous if the fluid being loaded is a hazardous material, such as gasoline or some other petroleum product.

The external reflection condition discussed above is demonstrated in FIG. 3. The surfaces 16, 18 of prism 10 are submersed in a fluid 20 within the container. This results in the transmission of the light from LED 12 into the fluid 20. In this example, a reflective surface 22 is located within the fluid at a certain distance from the bottom of the prism 20. This surface 22 can be any one of a number of different things, as long as it is reflective enough to direct a sufficient amount of light back toward the prism 20, and is located at an appropriate distance and orientation relative to the prism. One notable example is a piece of white debris (such as a piece of paper or plastic) suspended in the fluid 20.

As shown in FIG. 3, the light transmitted into the fluid from prism 20 is redirected by reflective surface back toward prism surface 18. The light is incident on a portion of surface 18 which refracts it toward the photodetector 14. If the optical signal reaching photodetector 14 is sufficient in magnitude, the detection threshold of the system may be overcome, so that a false permit signal is generated.

The particular location at which a reflective surface 22 will result in reflection of the LED signal back to the photodetector depends on a number of different variables. Factors such as the refractive index of the prism material and fluid 20, wavelength of light emitted by LED 12, and relative positioning of the LED 12 and photodetector 14 all contribute to the locations relative to the prism at which a reflective surface 22 could trigger a false permit signal. A typical petroleum tanker trunk (on which such probes are commonly used) carries gasoline. A typical overfill probe has a probe with a prism made of Pyrex® glass (Pyrex is a registered trademark of Corning, Inc.) and an LED with a center wavelength of 935 nm and a half-power bandwidth of 40 nm. The surfaces 16, 18 are angled at 45° relative to the orientation of the LED 12 and photodetector 14, and the LED 12 and photodetector are separated by approximately 0.220 inches, each being an equal distance from a centerline 24 of the prism 20. These dimensions are all typical of a SP-FU model overfill probe, manufactured by Scully Signal Company, Wilmington, Mass.

At the dimensions provided above, a false permit signal would result if reflective surface 22 was approximately 0.90 inches from the two prism/fluid interfaces at which the light exits and reenters the prism, although this distance may vary for different fluids. Denoted "X" in FIG. 3, this distance results from the separation of the LED 12 and photodetector 14, and the refractive angle θ, which is dependent on the various materials involved and the wavelength of light from the LED 12. In this example, the angle θ (which is measured from a normal to the surface 16) is approximately 52°. Since the angle of the surface 16 is 45° relative to the direction of the light leaving the LED 12, the light is therefore redirected by approximately 7° toward centerline 24. Obviously, the same angular relationship exists with regard to light reentering the prism through surface 18. These angles, result in a distance X of 0.79 inches as being that at which reflective surface 22 is most likely to trigger a false permit signal.

As mentioned above, the prism guard 17 (FIG. 2) is positioned to prevent errant light outside of the prism from reaching photodetector 14, particularly that light which is generated by LED 12 and exits the prism 10 through surface 16. This is accomplished by locating guard 17 within the distance X (as shown in FIG. 3) between the prism interfaces and the position at which a reflective surface 22 is most likely to trigger a false permit signal. While locating guard 17 further from the prism might still help reduce errant light from other sources, having the guard 17 within the distance X prevents virtually all external reflection of light from the LED 12 back to photodetector 14.

Figure 4:
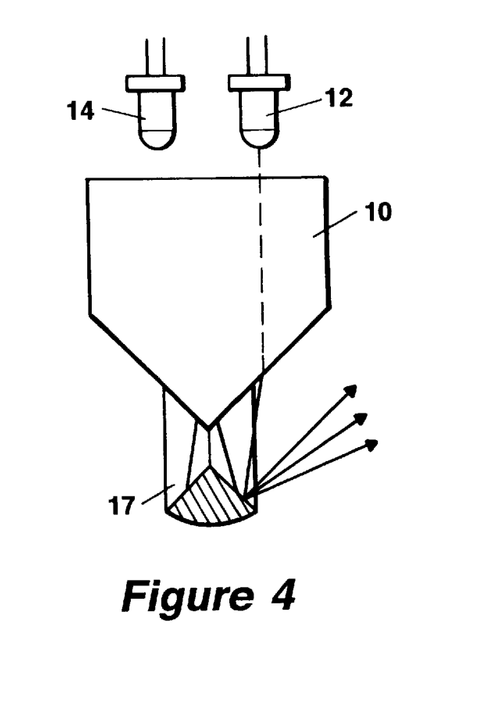
FIG. 4 is a cross-sectional view of a probe prism of the present invention showing the effect of an anti-reflective guard of the probe.

FIG. 4 is a schematic cross section of prism 10, LED 12, photodetector 14 and guard 17. In this figure, the rotational orientation of guard 17 relative to prism 10 is 90° different than that of FIG. 1. This positioning of guard 17 in FIG. 3 is to aid in describing the invention. However, it is noted that the relative rotational orientation between the guard 17 and prism 10 is irrelevant to the functionality of this embodiment of the invention. This will become apparent with description provided below.

In the arrangement of FIG. 4, light from LED 12 is coupled into the prism 10. When the prism is "wet," light from LED 12 passes through the prism/fluid interface at the angle θ, as discussed above with regard to FIG. 3. However, the light never reaches the full distance X at which reflection back to the photodetector is optimum, as it is incident on the guard 17. The guard 17 is preferably made from a dark, light-absorbing material, such as black Delrin plastic, to minimize any reflection. However, as shown in FIG. 4, the top surfaces of guard 17 are angled so as to direct any reflection which may nonetheless occur away from the prism. Regardless of what the rotational orientation of the guard 17 is relative to the location of LED 12 and photodetector 14, the angled surfaces of the guard successfully perform this redirection of light from the prism 10.

Since the guard 17 is positioned within the optimum reflection distance X, light from the optimum reflective distance X (or beyond) which has an angle that would direct it toward the photodetector 14 upon passing through the fluid/prism interface, is blocked from reaching the prism 10 by the guard 17. Only a small range of incidence angles at the fluid/prism interface would result in direction of light from outside the prism toward the photodetector 14. This entire range of angles is blocked by the guard 17. Thus, the guard 17 not only prevents the occurrence of a false permit signal due to a reflection of light originating at LED 12, but also one due to any other errant light which might otherwise be directed toward the prism 10 from the side of the guard 17 away from the prism 10.

Figure 5:
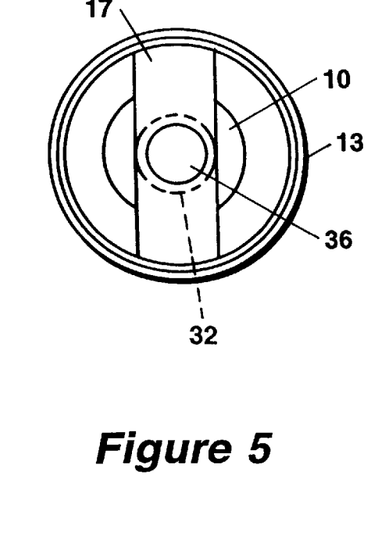
FIG. 5 is a bottom view of the anti-reflective guard of a probe according to the present invention, showing the orientation of the guard relative to the probe prism.

FIG. 5 is a bottom view of the guard 17, that is, a view from the side of the guard away from the prism 10. In this embodiment, the surfaces 16, 18 (as shown in FIG. 2) are both part of a conical lower surface of the prism 10. Given the angular constraints of the prism 10 described above in conjunction with FIG. 3, at a given distance from the prism 10, the prism only detects light within a given "viewing radius." That is, because of the refractive qualities of the fluid/prism interface, only light within a limited range of directions could reach the prism and be refracted toward the photodetector 14. Thus, the guard is centered directly below the prism, and the size and shape of the guard is selected to block that entire range of light directions.

With a minimum distance between the prism 10 and the guard 17 being approximately 0.094 inches, the viewing radius of the prism at the location of the guard is approximately 0.140 inches. The circular region defined by this radius is depicted by the broken line 32 shown in FIG. 5. As shown, the shape of the light-blocking portion of the guard 17 is such that it fully covers this viewing radius. Thus, no significant amount of light can reach the photodetector unless it is reflected from a surface located between the guard 17 and the prism 10. However, as discussed below, the present invention also substantially eliminates any triggering of a false permit signal by a reflective surface between the guard 17 and the prism 10.

Figure 6:
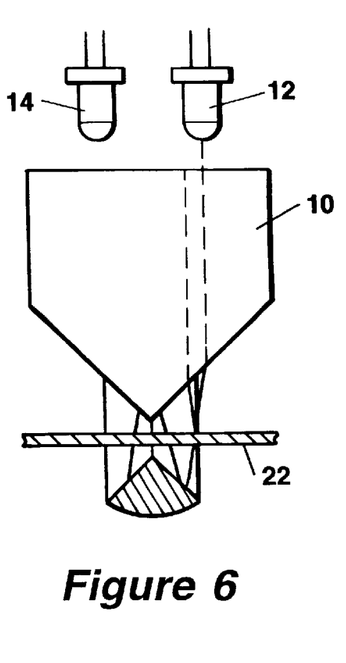
FIG. 6 is a cross-sectional view of a prism of the probe of the present invention showing the effect of the anti-reflective guard of the probe when a reflective surface is located between the guard and the probe prism.

Because of the location of the guard 17 relative to the prism 10, any reflective surface which is able to reflect light from LED 12 back to the prism 10 must be located between the guard 17 and the prism 10. An example of this situation is depicted in FIG. 6, in which reflective surface 22 is located between guard 17 and prism 10. With the probe located in a fluid container, it is possible that reflective surface 22 might find its way into the space between the guard 17 and the prism 10, and might reflect light from the LED that exits the prism back toward the prism 10. However, in such a situation, the necessarily close proximity of the reflective surface 22 to the prism 10 is insufficient to allow a reflection of the light back to the region of the fluid/prism interface upon which the light would have to be incident in order to reach the photodetector. That is, the reflective surface 22 is so much closer to the prism 10 than the optimum reflection distance X, that any single reflection of light originating at LED 12 does not reach photodector 14. As such, even if a reflection occurs, no false permit will be triggered. In essence, the guard 17 renders the probe "hyperopic" in that it is unable to detect a reflection from a reflective surface located between the guard and the prism 10. This condition exists in the present invention as long as the guard is positioned at or within the distance X.

While a certain complex shape could be determined for a reflective surface that, when positioned between the guard 17 and the prism 10, would allow it to reflect the light from the LED off two or more surfaces and redirect it in a direction necessary to reach the photodetector, the likelihood of such a surface accidentally floating into the space between the guard and the prism is negligible. Furthermore, the necessarily bulky shape of such a surface would severely inhibit its ability to accidentally become positioned in the necessary location.

Figure 7:
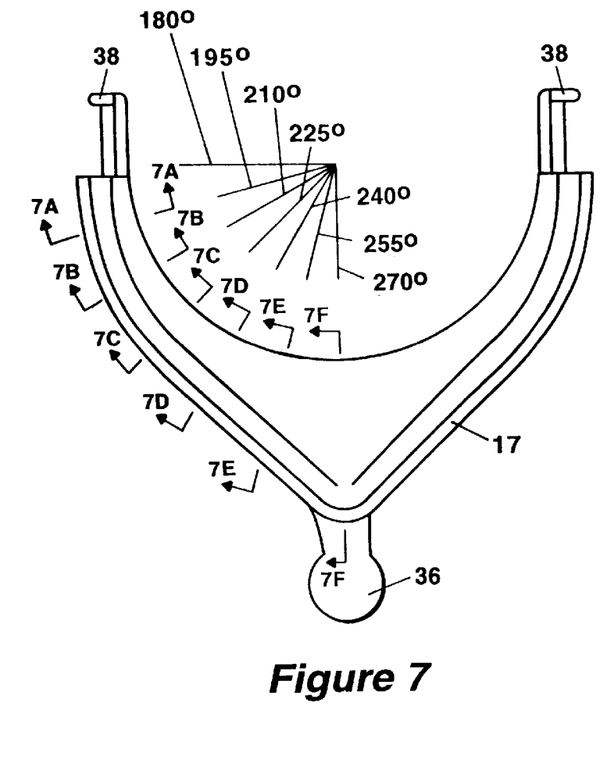
FIG. 7 is a front view of the guard of a probe according to the present invention.

FIG. 7 is a front view of guard 17, shown without the other components of the probe. A number of section lines are shown in FIG. 7 and refer to FIGS. 7A–7F. These section lines are taken through the body of guard 17 along rays that originate at a point within the center of the prism, and are separated by 15° increments. The series of cross-sectional views 7A–7F therefore depict the cross-sectional shape of guard 17 at different points along its length. The importance of this shape is discussed below.

Figures 7A, 7B, 7C:
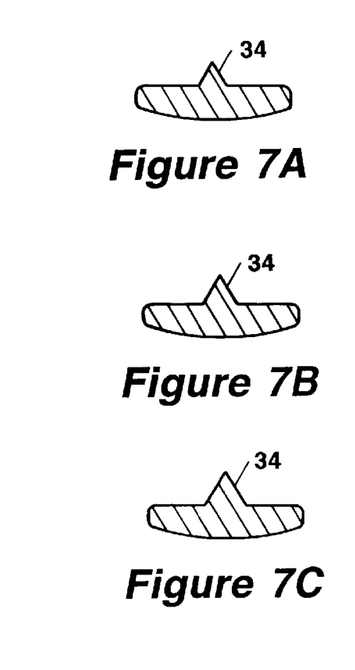
FIGS. 7A–7F are a series of cross-sectional views taken along the anti-reflective guard of FIG. 7.
Figure 7D:
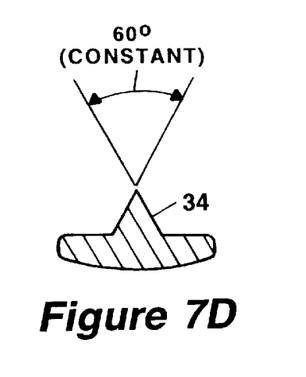
Figure 7E:
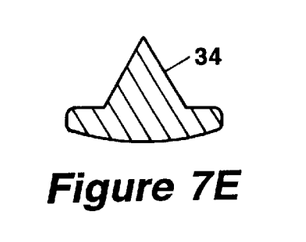

The cross-sectional shape of guard 17 in the region of section line 7A is shown in FIG. 7A. Along this section, the side of the guard away from the prism is slightly curved, and the opposite side of the guard is flat with a small angular peak 34 (having somewhat of a triangular cross section) in the middle. In the preferred embodiment, the two sides of the peak define an angle of approximately 60°. This angle is preferably constant along the inner surface of the guard 17. Following the change in shape of the guard inner surface along the section lines 7B–7F, it can be seen that the relative size of the triangular portion 34 increases to a maximum directly below the bottommost tip of prism 10. As can be seen from FIG. 7F, at this point, there is no longer any flat region adjacent to the triangular portion 34. Rather, the sides of the triangular region simply extend to the sides of the guard 17, which are parallel with the longitudinal direction of the probe.

The triangular portion 34 of guard 17 has a top edge that faces the prism 10, and serves to draw liquid away from the regions of prism 10 upon which light from LED 12 is incident. This wicking action is most effective when using a standard positioning of the probe in a fluid container. Typically, a probe such as that described herein is oriented such that the point of prism 10 faces downward, thus allowing fluid rising in the tank to encounter the cross-sectional surfaces 16, 18 simultaneously. Given this orientation, the shape and position of guard 17 is such that any moisture which forms along a surface of prism 10 tends to flow down toward the point of the prism, where it collects in a droplet. As the droplet grows in size, gravity pulls it downward further, and it encounters the triangular portion 34 of guard 17. The sharp angle of peak region 34 tends to disrupt any surface tension of the liquid, which flows downward to the tip end 36 of the guard 17.

Figure 7F:
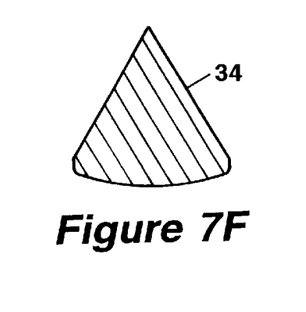

In the preferred embodiment the angle between the sides of peak region 34 is constant at 60° along the entire region 34 of guard 17. Thus, where the width of the triangular region 34 is greater along cross-sectional line 7F, the height of this section of guard 17 is also greater. Since the liquid which collects on guard 17 tends to wick downward under the force of gravity, it eventually travels onto partially-spherical base portion 36. The partially-spherical shape of portion 36 causes liquid to run downward along its sides, and drip off its underside. While portion 36 is not required for accurate operation of the invention, it is included in the preferred embodiment because it provides a more controlled dripping of moisture off of the surface of guard 17.

Referring again to FIG. 2, several of the relative dimensions of the probe and guard 17 are of interest for the preferred embodiment. These dimensions may be applied on various scales. However, because housings for probes such as that described herein commonly use a standardized diameter (such as a nominal outside diameter of 0.9375 inches), other dimensions are adjusted to accommodate this diameter. One relationship of concern in the preferred embodiment is the separation between the tip of prism 10 and the inside edge of guard 17 (shown as dimension "b" in FIG. 2). This dimension is set to be slightly smaller than the full diameter of a drop of high viscosity liquid formed under gravity from the tip of prism 10. Thus, prior to the formation of an entire droplet, the lower edge of the droplet contacts the sharp edge of guard 17, and is wicked away from prism 10. This dimension is also important relative to the separation between a center line passing through the tip of prism 10 and a line extended from the surface 16 of the prism that is colinear with the direction of light emitted from LED 12. This separation (indicated as dimension "a" in FIG. 2)

indicates the extent to which a drop of moisture can extend in a horizontal direction before it crosses into the path along which light from light source 12 travels, or contacts surface 16 at a point of incidence of light from light source 12. Since it is desirable to prevent liquid from remaining in the vicinity of the portions of the probe surface or surfaces at which light from light source is incident, it is preferable to keep dimension "b" smaller than dimension "a". This ensures that, before any droplet of liquid can extend into the optical range of light source 12, it will contact the inside edge of guard 17 and be wicked downward under the force of gravity.

As shown in FIG. 2 and FIGS. 7–7F, the inside edge of guard 17 maintains a sharp peak region 34, preferably having a 60° angle between the sides of the peak 34 along the entire length of the peak region. However, due to the fixed width of the probe housing, the size of peak region 34 is reduced toward the ends of the guard. This prevents the space between guard 17 and prism 10 from being too small, and thereby discourages the accumulation of material between the guard and prism. Also shown in FIG. 2 and FIG. 7 are retaining pins 38 of guard 17. Pins 38 fit within a circumferential, annular slot 40 located on the inner surface of the probe housing. Insertion of pins 38 into the slot during assembly of the probe is relatively simple, as the plastic material used for guard 17 may be deflected manually to move pins 38 slightly toward each other and allow insertion into the probe housing. Once inserted, the elastic quality the material of guard 17 causes the pins 38 to move away from each other, and enter different regions of slot 40. Once the guard 17 has been inserted, the interior area of the probe housing that surrounds the pins 38 is filled with a potting material 42 which firmly secures the guard 17 in place.

While not necessary, the probe housing 13 may extend down around the prism and the guard 17 to further protect the prism 10 and guard 17 from damage. This extended portion of probe housing 13 is not shown in FIG. 2, so as to allow clear depiction of the guard 17 and prism 10. However, conventional probe housings make use of such extensions, and they are considered well known in the art. Notches that are typically located in the side of such an extended portion allow fluid to rise up to the necessary level surrounding the prism 10 so that the fluid detection function is operational.

The preferred embodiment of the invention has been described with regard a specific prism shape and specific dimensions and materials. However, those skilled in the art will recognize that with some adaptation the present invention is applicable to many different dimensions and materials, all of which are considered to be within the scope of the present invention. In general, it will be recognized by those skilled in the art that various changes in form and detail may be made therein without departing from the spirit and scope of the claims as defined by the appended claims.

What is claimed is:

1. A fluid overfill detection probe comprising:

a light source which emits an optical signal within a predetermined wavelength range;

a photodetector which detects optical signals within the predetermined wavelength range;

a prism into which the optical signal is coupled by the light source, the prism being positioned relative to the photodetector such that light external to the prism that is in the predetermined wavelength range can pass through the prism and be detected by the photodetector substantially only along a predetermined range of directions; and an optical guard adjacent to the prism in a direction along which the fluid level changes, the guard having a light-obstructing portion physically separated from the prism such that fluid can occupy a region between the prism and the light-obstructing portion, and which the light-obstructing portion blocks light substantially along the entire predetermined range of directions.

2. A fluid overfill detection probe according to claim 1 wherein the predetermined range of directions is dependent on a refraction of light entering the prism.

3. A fluid overfill detection probe according to claim 1 further comprising a probe housing within which the light source, the photodetector and the prism reside.

4. A fluid overfill detection probe according to claim 3 wherein the guard is secured to the probe housing.

5. A fluid overfill detection probe according to claim 4 wherein the housing has a recess that receives a portion of the guard which contacts the housing and inhibits separation of the guard from the probe housing.

6. A fluid overfill detection probe according to claim 3 wherein the probe further comprises an anchoring material that secures the guard to the probe housing.

7. A fluid overfill detection probe according to claim 1 wherein the guard is substantially V-shaped.

8. A fluid overfill detection probe according to claim 1 wherein at least one surface of the guard is oriented such that any light exiting the prism that reflects from the surface is redirected away from the prism.

9. A fluid overfill detection probe according to claim 1 wherein the guard comprises a substantially light-absorbent material.

10. A fluid overfill detection probe according to claim 1 wherein the light-obstructing portion of the guard has a distance from the prism no greater than X, where X is a minimum distance, given the refractive qualities of the prism, by which a reflective surface would have to be separated from the prism to enable a maximum amount of light emitted by the light source to exit the prism, reflect off the reflective surface, reenter the prism and be detected by the photodetector.

11. A fluid overfill detection probe according to claim 1 wherein the prism has a substantially conical surface.

12. A fluid overfill detection probe according to claim 1 wherein the light source is an LED.

13. A fluid overfill detection probe according to claim 1 wherein the guard has a proximity to the prism close enough to contact moisture accumulated on a prism surface and a shape that, when in contact with said moisture, tends to wick the moisture away from the prism surface.

14. A fluid overfill detection probe according to claim 13 wherein the guard has an edge that faces the prism.

15. A fluid overfill detection probe according to claim 14 wherein said edge is formed by two surfaces having an acute angle relative to each other.

16. A fluid overfill detection probe according to claim 13 wherein the guard is positioned relative to the prism such that a drop of moisture near a bottommost portion of the prism, as it expands, will contact the guard before expanding into an optical path of light from the light source.

17. A fluid overfill detection probe according to claim 1 wherein the guard tends to wick moisture in a direction away from the prism.

18. A fluid overfill detection probe comprising:

a light source which emits an optical signal;

a photodetector which detects the optical signal;

a prism into which the optical signal is coupled by the light source; and a prism guard having a proximity to the prism close enough to contact moisture accumulated on a prism surface and a shape that, when in contact with said moisture, tends to wick the moisture away from the prism surface.

19. A fluid overfill detection probe comprising:
a light source which emits an optical signal;
a photodetector which detects the optical signal;
a prism into which the optical signal is coupled by the light source; and
an optical guard secured to the probe housing adjacent to the prism in a direction along which the fluid level changes, the guard having a light-obstructing portion located a distance from the prism less than X, where X is a minimum distance, given the refractive qualities of the prism, by which a reflective surface would have to be separated from the prism to enable a maximum amount of light emitted by the light source to exit the prism, reflect off the reflective surface, reenter the prism and be detected by the photodetector.

20. A fluid overfill detection probe according to claim 19 wherein the guard has a proximity to the prism close enough to contact moisture accumulated on a prism surface and a shape that, when in contact with said moisture, tends to wick the moisture away from the prism surface.

21. A method of detecting when fluid in a fluid container reaches a predetermined level, the method comprising:
locating in the container at substantially the predetermined level a fluid overfill probe comprising a light source which emits an optical signal within a predetermined wavelength range, a photodetector which detects optical signals within the predetermined wavelength range and a prism into which the optical signal is coupled by the light source, the prism being positioned relative to the photodetector such that light external to the prism that is in the predetermined wavelength range can pass through the prism and be detected by the photodetector substantially only along a predetermined range of directions; and
blocking a transmission of light external to the prism with an optical guard adjacent to the prism in a direction along which the fluid level changes, the guard having a light-obstructing portion physically separated from the prism such that fluid can occupy a region between the prism and the light-obstructing portion, and which the light-obstructing portion blocks light substantially along the entire predetermined range of directions.

22. A method according to claim 21 further comprising housing the light source, the photodetector and the prism within a probe housing and securing the guard to the probe housing.

23. A method according to claim 22 further comprising providing an anchoring material which secures the guard to the probe housing.

24. A method according to claim 21 wherein blocking the transmission of light external to the prism comprises blocking light with a guard that is substantially V-shaped.

25. A method according to claim 21 wherein blocking the transmission of light with a guard comprises blocking the transmission of light with a guard having a light-obstructing portion that is a distance from the prism no greater than X, where X is a minimum distance, given the refractive qualities of the prism, by which a reflective surface would have to be separated from the prism to enable a maximum amount of light emitted by the light source to exit the prism, reflect off the reflective surface, reenter the prism and be detected by the photodetector.

26. A method according to claim 21 further comprising wicking moisture away from a surface of the prism with a proximate portion of the guard.

27. A method according to claim 26 further comprising providing the proximate portion of the guard with an edge that faces the prism.

28. A method according to claim 27 wherein providing the proximate portion of the guard comprises providing the proximate portion of the guard with an edge formed by two surfaces having an acute angle relative to each other.

29. A method according to claim 26 further comprising locating the guard relative to the prism such that a drop of moisture near the bottommost portion of the prism, as it expands, will contact the guard before expanding into an optical path of light from the light source.

30. A method of detecting when fluid in a fluid container reaches a predetermined level, the method comprising:
locating in the container at substantially the predetermined level a fluid overfill probe comprising a light source which emits an optical signal, a photodetector which detects the optical signal and a prism into which the optical signal is coupled by the light source; and
wicking moisture away from a surface of the prism with a proximate portion of a prism guard located adjacent to the prism.

31. A method of detecting when fluid in a fluid container reaches a predetermined level, the method comprising:
locating in the container at substantially the predetermined level a fluid overfill probe comprising a light source which emits an optical signal, a photodetector which detects the optical signal and a prism into which the optical signal is coupled by the light source;
blocking a transmission of light external to the prism with an optical guard adjacent to the prism, the guard having a light-obstructing portion located a distance from the prism no greater than X, where X is a minimum distance, given the refractive qualities of the prism, by which a reflective surface would have to be separated from the prism to enable a maximum amount of light emitted by the light source to exit the prism, reflect off the reflective surface, reenter the prism and be detected by the photodetector.

32. A fluid overfill detection probe according to claim 19 further comprising a probe housing within which the light source, the photodetector and the prism reside.

33. A fluid overfill detection probe according to claim 19 wherein the guard comprises a substantially light-absorbent material.

34. A fluid overfill detection probe comprising:
a light source which emits an optical signal within a predetermined wavelength range;
a photodetector which detects optical signals within the predetermined wavelength range;
a prism into which the optical signal is coupled by the light source; and
an optical guard adjacent to the prism, the guard having at least one surface that is oriented such that any light exiting the prism that reflects from the surface is redirected away from the prism.

35. A fluid overfill detection probe according to claim 34 further comprising a probe housing within which the light source, the photodetector and the prism reside.

36. A fluid overfill detection probe according to claim 34 wherein the guard comprises a substantially light-absorbent material.

* * * * *